United States Patent [19]

Zhong et al.

[11] Patent Number: 5,502,136
[45] Date of Patent: Mar. 26, 1996

[54] PROCESS FOR MAKING SUBSTANTIALLY HOMOGENEOUS COPOLYMERS OF VINYL PYRROLIDONE AND VINYL ACETATE WHICH FORM CLEAR AQUEOUS SOLUTIONS

[75] Inventors: Yuanzhen Zhong, Wayne; Philip F. Wolf, Bridgewater; Yakir Reuven, West Orange, all of N.J.

[73] Assignee: ISP Investments Inc., Wilmington, Del.

[21] Appl. No.: 365,526

[22] Filed: Dec. 28, 1994

[51] Int. Cl.$^6$ .......................... C08F 226/10; C08F 218/08
[52] U.S. Cl. ............................................. 526/264; 526/330
[58] Field of Search .................................... 526/264, 330

[56] References Cited

U.S. PATENT DOCUMENTS

| 4,039,734 | 8/1977 | Hendy | 526/258 |
| 4,520,179 | 5/1985 | Barabas et al. | 526/212 |
| 5,319,041 | 6/1994 | Zhong et al. | 526/73 |

*Primary Examiner*—Joseph L. Schofer
*Assistant Examiner*—Wu C. Cheng
*Attorney, Agent, or Firm*—Walter Katz; Marilyn J. Maue; Joshua J. Ward

[57] ABSTRACT

A process is described for making substantially homogeneous copolymers comprising 50–90% of vinyl pyrrolidone (VP) and 10–50% of vinyl acetate (VA), by weight, which form clear aqueous solutions.

5 Claims, 2 Drawing Sheets

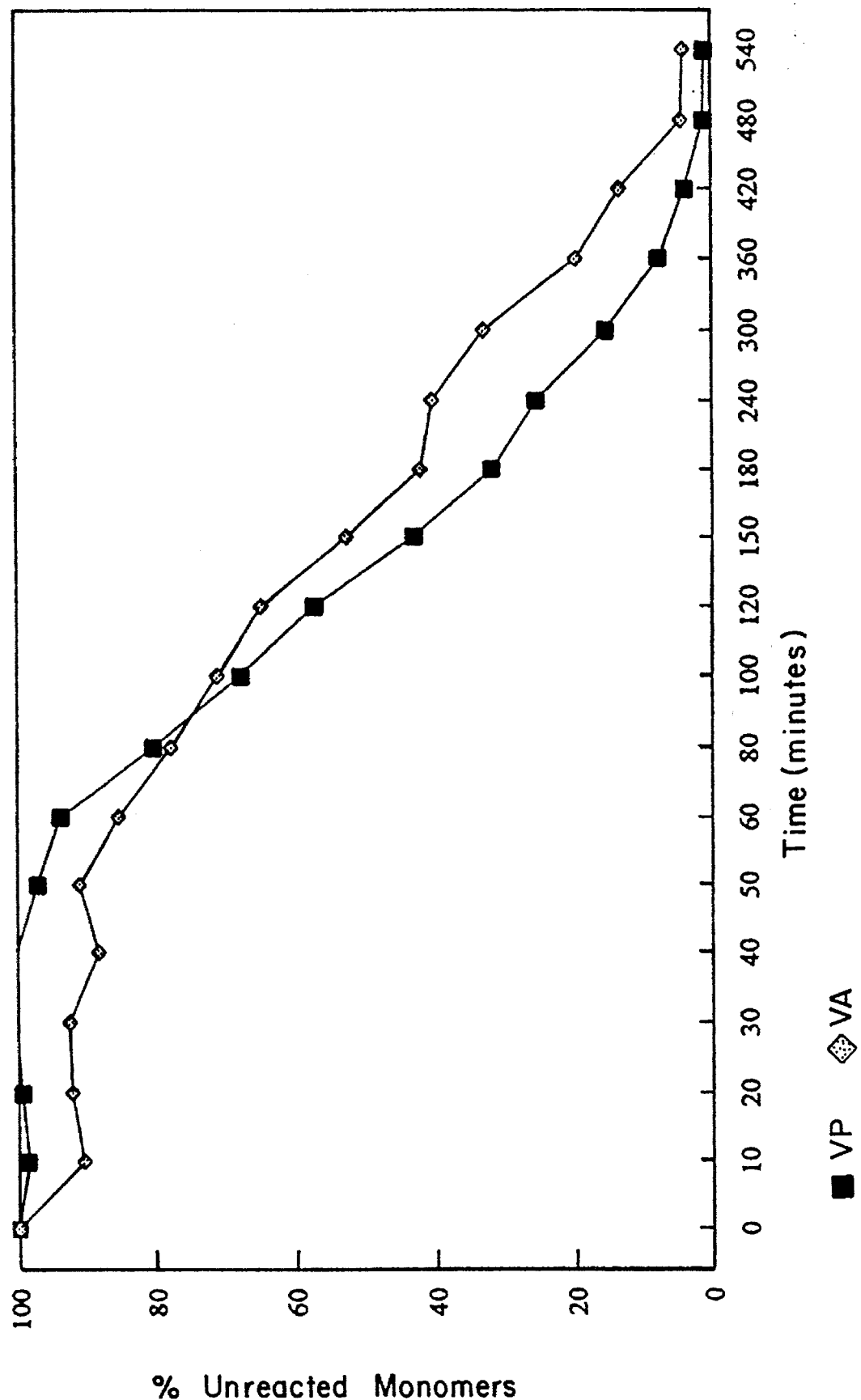

PROCESS FOR MAKING SUBSTANTIALLY HOMOGENEOUS COPOLYMERS OF VINYL PYRROLIDONE AND VINYL ACETATE WHICH FORM CLEAR AQUEOUS SOLUTIONS

FIELD OF THE INVENTION

This invention relates to a process for making copolymers of vinyl pyrrolidone (VP) and vinyl acetate (VA), and, more particularly, to a process of making substantially homogeneous copolymers of VP and VA as clear aqueous solutions.

DESCRIPTION OF THE INVENTION

Copolymers of vinyl pyrrolidone (VP) and vinyl acetate (VA) monomers have significant utility in the pharmaceutical and cosmetic industries. Generally, these copolymers are prepared by a batch process in which selected amounts of the vinyl pyrrolidone and vinyl acetate monomers are charged in alcohol or alcohol-water mixtures as solvent and peroxy or azo type as initiator and heated to a reaction temperature for several hours. For these uses, however, it is necessary that the copolymer be present as clear aqueous solutions. This property is characteristic of a copolymer having a substantially homogeneous structure.

Homogeneous copolymers of VP and VA are difficult to prepare because vinyl pyrrolidone is a significantly more active monomer during the copolymerization than the vinyl acetate monomer. Accordingly, VP monomer will react faster and go into the copolymer chains first as VP units. The VA monomer will react later leading to formation of VA blocks in the copolymer. Since VA is much less water soluble than VP, the presence of VA blocks in the heterogeneous copolymer will reduce its water solubility appreciably. The resultant copolymer thus will appear cloudy in water solution. Such cloudy solutions are indicative of polymers having a low cloud point, i.e. they appear cloudy at room temperature.

U.S. Pat. No. 5,122,582 attempted to produce homogeneous copolymers of VP and VA by continuously removing unreacted vinyl acetate with superheated steam; however, this step reduced the conversion yield and gave only copolymers having a variable composition.

British patent 1,323,028 describes a homogeneous VP/VA copolymer prepared by an intricate process employing a continuous phase in which VP is soluble and a disperse phase in which VA is suspended. Copolymerization takes place exclusively in the disperse phase while the continuous phase functions as a VP reservoir. Although successful in producing a homogeneous product, this process, using AIBN initiator, is extremely limited in the choice of solvents for the disperse phase, e.g. benzene, toluene and for the continuous phase, e.g. acids or polyols, and is further complicated by the need for the removal of both solvents and substantial portions of VP monomer in the continuous phase. Additionally, this process, employing the VA reservoir, fails to maximize the reactive efficiency of the VA monomer.

Accordingly, it is an object of this invention to provide a process for making homogeneous copolymers of vinylpyrrolidone and vinyl acetate monomers of predetermined composition which form clear aqueous solutions at a high solids level.

These and other objects and features of the invention will be made apparent from the following more particular description of the invention.

SUMMARY OF THE INVENTION

A process is described for making homogeneous copolymers of vinylpyrrolidone (VP) and vinyl acetate (VA) of predetermined composition, suitably 50–90% VP and 10–50% VA, by weight, which copolymers can form clear aqueous solutions at room temperature. The homogeneous process involves precharging all the VA monomer, and part of the VP, suitably 15–40% of the VP, and then feeding the rest of the VP at a predetermined rate so that the rate of disappearance of VA is substantially matched by the rate of disappearance of VP during the polymerization.

IN THE DRAWINGS

FIG. 2 is a graphical representation of the homogeneous VP/VA copolymerization process of the invention in which is plotted percent unreacted VP and VA vs. time during the preparation of a solution of 70:30% by weight VP/VA copolymer at 50% final solids in water.

DETAILED DESCRIPTION OF THE INVENTION

Figure 1:
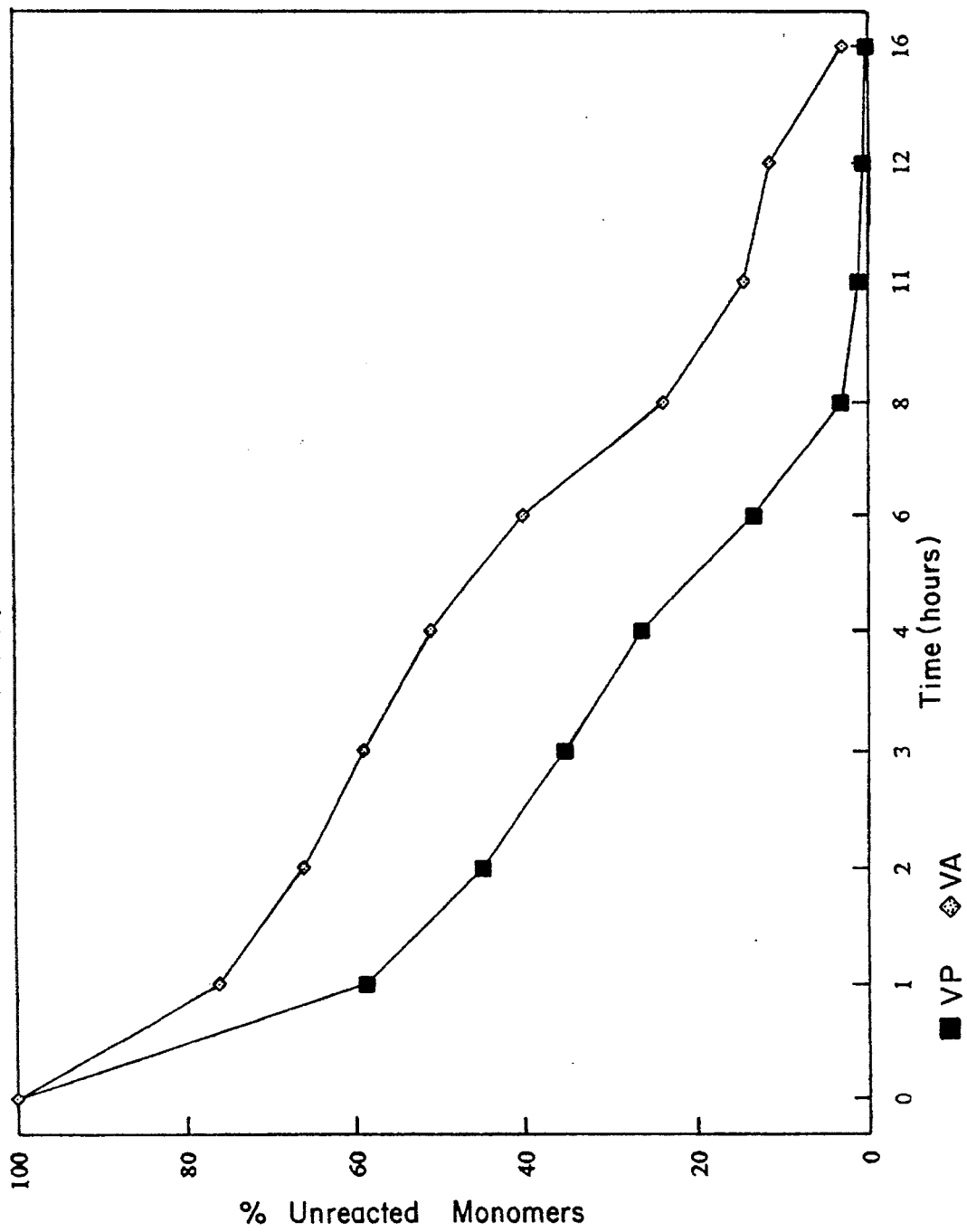
FIG. 1 is a graphical representation of a non-homogeneous (one-pot) VP/VA copolymerization process in which is plotted percent unreacted VP and VA vs. time for a reaction mixture of 70:30% by weight VP/VA copolymer at 50% final solids in water.

In accordance with the present invention, a process is provided for making substantially homogeneous.copolymers of vinyl pyrrolidone and vinyl acetate of predetermined composition.

In this process, the less reactive monomer of the copolymer (VA) is precharged into a reactor at a suitable reaction temperature, generally about 60°–90° C., preferably 85° C. Then the more reactive monomer (VP) is introduced incrementally into the VA-charged reactor at a rate which corresponds to the observed rate of disappearance of VA.

The entire predetermined amount of the VA monomer is added before substantially all the VP monomer has been consumed so that both monomers can react to form a substantially homogeneous copolymer in a desired compositional ratio of VP:VA. Consequently, a copolymer is obtained whose composition approaches the nominal monomer ratio of the desired copolymer composition and whose structure has the two individual monomeric units of the copolymer distributed substantially uniformly in a homogeneous chain along the backbone of the polymer.

The precharge in the process of the invention may include some VP therein, generally in an amount which is about 15–40% of the total amount of VP required for the predetermined copolymer composition, without affecting the homogeneous polymerization process. However, it is still necessary that the rate of addition of VP after any precharge is carried out at substantially the rate of disappearance of VA during copolymerization.

The schedule of addition of VP to accomplish the desired matched rate of reaction of VA is determined in the following manner.

DETERMINATION OF ADDITION SCHEDULE FOR VP TO FORM A HOMOGENEOUS COPOLYMER OF VP AND VA

A. First, a one-pot copolymerization of VP and VA was carried out as follows:

EXAMPLE 1

VP (171 g), VA (110 g), and isopropanol (282 g) were charged into a 1-liter resin pot equipped with a gas inlet, a liquid inlet, a thermometer and a condenser. A stream of nitrogen then was bubbled through the solution and maintained during the reaction. The solution was gradually heated to 70° C.; then 0.13 ml of AIBN as catalyst was added; then another 0.037 g of the catalyst was added every 2 hours. After varying temperature of 85° C., a booster initiator Lupersol 554 was added after 10 hours during a 2-hour period and held to 16 hours. Supplemental VP was added (34.8 g) after 2.5 hours and 225 g after 4.5 hours. The total process was carried out over a 16-hour period.

The relative percentage amounts of residual monomers present during the course of the one-pot reaction was determined by gas chromatographic analysis after sampling the reaction mixture periodically. The analytical data obtained then was plotted as the graph of FIG. 1.

As shown in FIG. 1, VP reacts much more rapidly than VA. Accordingly, after 480 minutes, all the VP is consumed while residual VA monomer still is available for homopolymerization. Thus the copolymer formed is of a composition different from the desired monomer ratio selected by the precharged amounts of the two monomers. Under these experimental conditions, the polymer product obtained is a complex mixture of a homopolymer which is polyvinylpyrrolidone, and a copolymer of VP and VA of uncertain composition.

B. To form a homogeneous copolymer, it is necessary that the curve of conversion vs. time for VP substantially coincide or match the rate of conversion curve for VA. To accomplish this, the VA is precharged and substantially all the VP is fed after to the precharge at a feeding schedule determined by the following method:

The % VP monomer to be fed at time t of the polymerization is determined from the Asymmetric Double Sigmoidal Distribution formula, $A_t$, below, which has four adjustable parameters, $a_1$, $a_2$, $a_3$ and $a_4$:

$$A_t = \frac{1}{1 + \exp\left[\frac{a_1 - \frac{a_2}{2} - t}{a_3}\right]} \left[1 - \frac{1}{1 + \exp\left[\frac{a_1 + \frac{a_2}{2} - t}{a_4}\right]}\right]$$

where t=time (in minutes) from the beginning of the copolymerization;

$a_1$ is a parameter which determines the center of the distribution;

$a_2$ is a parameter which affects the width of the distribution;

$a_3$ is a parameter which determines the ascending portion of the distribution; and $a_4$ is a parameter which determines the descending portion of the distribution.

$$\% \text{ VP to be fed at time } t = \frac{A_t}{\sum_{t=0}^{N} A_t} \times 100$$

where N=time when the polymerization is completed.

To match the VP conversion curve to the VA conversion curve an "initial guess" is made for the values of $a_1$, $a_2$, $a_3$ and $a_4$ based on the results in FIG. 1. These values then are inserted into the $A_t$ formula and the % VP to be fed at time t is calculated. Then a polymerization reaction is carried out using this schedule. The resulting % unreacted VP during this polymerization will probably still not match the % unreacted VA at the same time t. If the % unreacted VP at time t is too large, then the value of $a_3$ (ascendency) in the $A_t$ formula is increased, $a_4$ (descendency) is decreased, $a_1$ (center) is decreased, and $a_2$ (width) is decreased. Conversely, if the initial guess values of $a_1$ through $a_4$ give a conversion for VP which is too fast, then changes in the values of $a_1$ through $a_4$ are made in a direction opposite to those discussed above.

These new values of the parameters are then used to determine a new feeding schedule. Using this feeding schedule, another polymerization is carried out, and the process of adjustment of the parameters described above is repeated.

This process is known as "interative fitting" of data to a curve. After 4 or 5 such iterative fittings, the experimental VA and VP curves will be matched to a satisfactory degree, as shown in FIG. 2 herein.

The matching curves of VP and VA in FIG. 2 can originate from at least one set of values for $a_1$, $a_2$, $a_3$ and $a_4$ (the last set of the iterative fitting process) used to calculate a suitable feeding schedule of VP over the entire period of the polymerization. One such set is:

$a_1=1$ $a_2=15$ $a_3=1$ $a_4=110$

C. With such a suitable VP feeding schedule available, a homogeneous copolymer of VP and VA was prepared as described in Example 2 below.

EXAMPLE 2

Preparation of a Homogeneous Copolymer of VP and VA

In this process, 113.75 g (100%) of vinyl acetate, 63.79 g (27%) of vinyl pyrrolidone, and 177.54 g of isopropanol were charged to a 1-liter water jacketed resin flask.

The flask was equipped with an overhead stirrer connected to an anchor stirrer, a nitrogen inlet for sparging to remove dissolved air and a thermocouple which is connected to a temperature controller. The temperature was raised to 85° C., by passing heated water from a temperature controlled bath into the jacket of the resin flask. A mechanical syringe pump which could be set to deliver VP at a set rate was connected to the reactor through polyethylene tubing.

The VP reactant was added from the syringe pump according to the following feeding schedule:

| Time (min.) | Amount of VP Added (g) |
|---|---|
| 0–30 | 31.35 |
| 30–60 | 27.29 |
| 60–90 | 23.28 |
| 90–120 | 19.52 |
| 120–150 | 16.10 |

-continued

| Time (min.) | Amount of VP Added (g) |
|---|---|
| 150–180 | 13.09 |
| 180–210 | 10.51 |
| 210–240 | 8.35 |
| 240–270 | 6.57 |
| 270–300 | 5.13 |
| 300–330 | 3.99 |
| 330–360 | 3.09 |
| 360–390 | 2.38 |
| 390–420 | 1.83 |
| 420–450 | 0 |
| 450–480 | 0 |
| 480–510 | 0 |
| 510–540 | 0 |

The totals added in this manner during the entire reaction were VP (236.27 g), VA (113.75 g) and isopropanol (1530 g).

Additions of Vazo 67 (2,2'-azobis(2-methylbutanenitrile) initiator as a solution of 0.082 g of the initiator in 1 ml isopropanol, were made every 30 minutes during the 9 hour reaction.

The product was discharged as a clear, moderately viscous, aqueous solution of a substantially homogeneous copolymer of VP and VA in a 70:30 weight ratio at a 64% solids level. The residual vinyl pyrrolidone content was <0.5%. The K-value was 28.4.

The procedure described above can be repeated to provide optimized VP feeding schedules for any selected copolymer composition, and at any particular solids content, at a prescribed polymerization temperature, solvent level, and amount of initiator.

VP and VA are monomers with quite different properties. VP monomer, and VP homopolymers, i.e. PVP, are soluble in water because they can form hydrogen bonds between nitrogen atoms and water molecules. VA monomer, on the other hand, does not form hydrogen bond with water; accordingly, its hydrophobic organic groups result in water insolubility. VA homopolymers, even with low molecular weights, also are water insoluble. Thus, to provide a P(VP/VA) copolymer which is soluble in water, the VA units need help from the VP units. For example, in a homogeneous P(VP/VA) copolymer of predetermined composition, e.g. a monomer weight ratio of 60:40, corresponding to a molar ratio of 0.53:0.47, the VP and VA unit ratio is about 1:1. A homogeneous (or alternating) copolymer at this ratio will have good solubility in water. However, if this copolymer composition is heterogeneous, i.e. there is a large number of VA unit blocks in the chains, produced by homopolymerization, the copolymer will have poor solubility in water.

The examples given below demonstrate that the process according to the invention generated homogeneous PVP/VA copolymers with controlled monomer distribution in the polymer chains. Specifically, VP and VA copolymers of having a weight of 70 to 30 had excellent solubility in water, e.g. 10% and 25% by weight aqueous copolymer solutions were clear (turbidity below 11 ntu, a nephelometric turbidity unit, as measured by the HACH ratio turbidimeter), were substantially colorless.

The solvent for polymerization during the process according to the invention can be either alcohol (ethanol or isopropanol) or a mixture of alcohol and water (the water content can range from 0% to 50% by weight based on the total amount of solvent).

The process according to the invention is illustrated below by the preparation of VP/VA copolymers comprising (a) 50% to 90% by weight VP and (b) 10% to 50% by weight VA, suitably having K-values of 15–50, preferably 25–35.

The overall process according to the invention preferably consists of the following several steps:

(A) Polymerization (discussed above); and (B) Solvent exchange (to replace the organic solvent by water); and, optionally (C) Post-treatment (to reduce residual monomers to less than 100 ppm); and (D) Drying (to obtain the product in powder form).

While the examples given above describe VP/VA copolymers in a VP and VA weight ratio of 70:30, the process of the invention can be used to make any homogeneous copolymer composition from a predetermined ratio of monomers.

What is claimed is:

1. A process for making substantially homogeneous copolymers of 50–90% vinyl pyrrolidone (VP) and 10–50% vinyl acetate (VA) monomers, by weight, which form clear aqueous solutions at room temperature, by polymerization of the monomers in a water miscible organic solvent, or mixtures of the solvent with water, in the presence of a radical initiator, which comprises:

(a) precharging a reactor with a predetermined initial amount of the VA monomer in accordance with a selected weight ratio of said monomers, and about 15–40% by weight of said selected amount of VP, and the solvent and initiator, at a polymerization temperature, and (b) introducing vinyl pyrrolidone into said reactor at a specific feeding schedule determined from the following Equations:

$$A_t = \frac{1}{1 + \exp\left[\dfrac{a_1 - \dfrac{a_2}{2} - t}{a_3}\right]} \left[ 1 - \frac{1}{1 + \exp\left[\dfrac{a_1 + \dfrac{a_2}{2} - t}{a_4}\right]} \right] \quad \text{EQUATION 1}$$

where $A_t$ has four adjustable parameters, $a_1$, $a_2$, $a_3$ and $a_4$;

$a_1$ is a parameter which determines the center of the distribution;

$a_2$ is a parameter which affects the width of the distribution;

$a_3$ is a parameter which determines the ascending portion of the distribution; and $a_4$ is a parameter which determines the descending portion of the distribution; and t=time (in minutes) from the beginning of the copolymerization;

$$\% VP \text{ to be fed at time } t = \frac{A_t}{\sum_{t=0}^{N} A_t} \times 100 \quad \text{EQUATION 2}$$

where N=time when the polymerization is completed; wherein a set of determined values for $a_1$, $a_2$, $a_3$ and $a_4$ provides said specific feeding schedule and assures that the curve of the rate of disappearance of the VA monomer during the polymerization is substantially matched by the rate of disappearance of the VP monomer, as shown in FIG. 2 herein.

2. A process according to claim 1 wherein the homogeneous copolymer of vinyl pyrrolidone and vinyl acetate has a weight ratio of 60–80 to 20–40, respectively.

3. A process according to claim 2 wherein said weight ratio is about 70 to 30.

4. A process according to claim 1 wherein the initial precharge has a monomer concentration of 30–50% by weight of the total batch.

5. A process according to claim 1 wherein the final monomer concentration is about 50–80% by weight.

* * * * *